(No Model.)

W. H. HOLCOMB.
SEEDER.

No. 355,082. Patented Dec. 28, 1886.

WITNESSES:

INVENTOR:
W. H. Holcomb
BY Munn & Co.
ATTORNEYS.

N. PETERS, Photo-Lithographer, Washington, D. C.

UNITED STATES PATENT OFFICE.

WILLIAM HENRY HOLCOMB, OF CORAL, MICHIGAN.

SEEDER.

SPECIFICATION forming part of Letters Patent No. 355,082, dated December 28, 1886.

Application filed November 2, 1886. Serial No. 217,803. (No model.)

*To all whom it may concern:*

Be it known that I, WILLIAM HENRY HOLCOMB, of Coral, in the county of Montcalm and State of Michigan, have invented a new and Improved Seeder, of which the following is a full, clear, and exact description.

This invention relates to seeders, the object of the invention being to provide an implement which may be used to plant most any kind of seed irrespective of the size of the seed, and which may also be adjusted to deliver a certain required amount of seed to the running foot or yard, as will be hereinafter described, and specifically pointed out in the claim.

Reference is to be had to the accompanying drawings, forming a part of this specification, in which similar figures of reference indicate corresponding parts in all the views.

Figure 1:
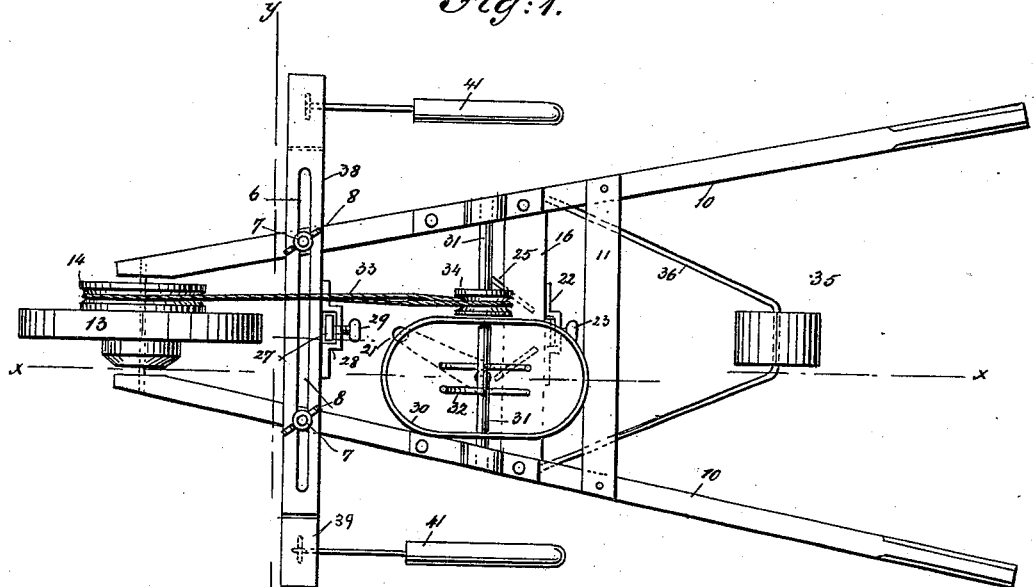
Figure 3:
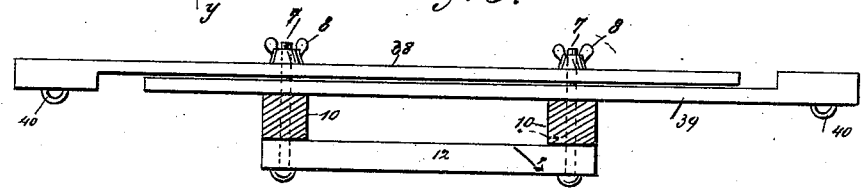
Figure 2:
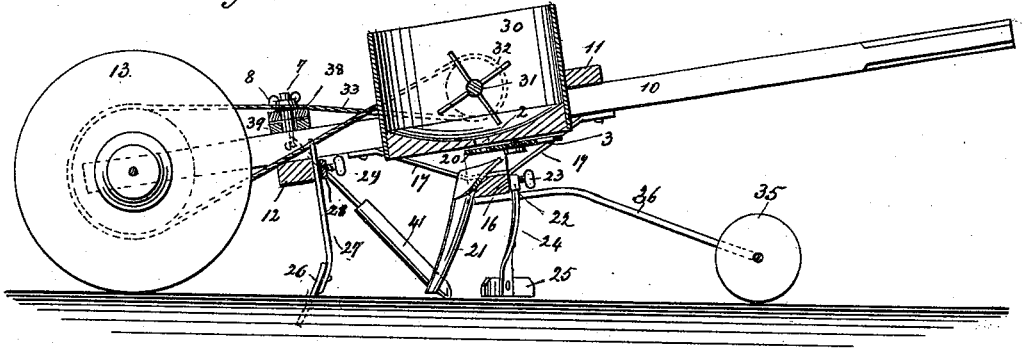
Figure 4:
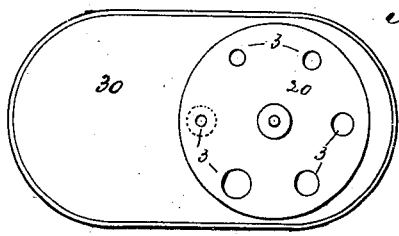

Figure 1 is a plan view of my improved form of seeder. Fig. 2 is a sectional elevation taken on line x x of Fig. 1. Fig. 3 is an enlarged cross-sectional view taken on line y y of Fig. 1, the view being given to represent the arrangement of the adjustable supports for the markers; and Fig. 4 is an inverted plan view of the hopper and the disk formed with graduated apertures that is carried thereby.

In the drawings, 10 represents the handles of my improved form of seeder, which handles are connected by cross-bars 11 and 12, the connection being such that the handles approach each other toward the forward end of the machine, and between these approaching ends there is mounted the main supporting and driving wheel 13 of the planter, upon one side of which wheel there is arranged a pulley, 14.

The hopper 30 of the seeder is supported just in advance of the cross-bar 11, and beneath the hopper there is arranged a cross-bar, 16, which said bar is supported by trusses 17, that are secured to the handles 10. In the bottom of the hopper there is an aperture, 2, and to the bottom of the hopper there is connected a disk, 20, that is formed with a number of apertures, 3, said apertures being graduated and so arranged that any one desired may be turned to a position to register with the aperture 2 in the bottom of the hopper.

The cross-bar 16 carries a seed-delivery spout, 21, and a bracket, 22, which said bracket is provided with a set-screw, 23. The standards 24 of the furrow-closers 25 are mounted within the bracket 22 and held to place by the set-screw 23, the arrangement being such that the height of the furrow-closers may be adjusted to such position as may be required. The furrow-opener 26 is carried by a standard, 27, that is mounted in a bracket, 28, said bracket being fixed to the cross-bar 12, while the standard is held to place by a set-screw, 29, as best shown in Figs. 1 and 2.

The shaft 31 is mounted in bearings that are carried by the handles 10, and this shaft passes through the hopper 30 and carries fingers 32, that are arranged to revolve within the hopper, the shaft 31 being driven by means of a driving-belt, 33, which passes over the pulley 14 and also over a pulley, 34, that is carried by the shaft 31.

A small packing-wheel, 35, is mounted upon rearwardly-extending arms 36, the forward ends of said arms being rigidly connected to the cross-bar 16.

In advance of the hopper, or at any other convenient position, I mount two cross-strips, 38 and 39, each of said strips being formed with a longitudinal slot, 6, through which there extend bolts 7, that are carried by the handles 10, the extending ends of said bolts being engaged by winged nuts 8.

Each of the strips 38 and 39 is provided with an eye, 40, into which there is hooked the upper end of a swinging marker, as 41, the arrangement being such that by turning off the winged nuts 8 the strips 38 and 39 may be adjusted to project more or less beyond either side of the machine, and as the machine advances the markers will drag upon the ground and thus mark off or indicate the point at which it is desired to plant the adjacent row to that being planted at the time the marking was so performed.

In operation the disk 20 is moved so that an aperture of proper size will be brought into register with the aperture in the bottom of the hopper, and the furrow openers and closers are adjusted to meet the requirements of the case. Then, as the machine is forced ahead by the operator, the wheel 13 will revolve and its motion will be communicated to the shaft 31 through the medium of the belt 33, thus imparting a rotary motion to the shaft and causing the seed contained within the hopper to be carried toward the aperture 2.

If desired, the frame described may be used as a cultivator-frame, the standards of the cultivator-shovels being secured to the bars 12 and 16 by means of brackets and set-screws, such as have been described in connection with the furrow openers and closers.

Having thus fully described my invention, I claim as new and desire to secure by Letters Patent—

A seeder comprising the handles 10, the wheel 13, mounted between the converging ends of said handles and carrying the pulley 14, the hopper 30, having an aperture, 2, in its bottom, the disk below the hopper and having apertures adapted to register with the hopper-aperture, the transverse stirrer-shaft extending through the hopper and having a pulley, 34, the belt 33, connecting said pulley and the pulley 14, the bracket 28, secured to a crosspiece in front of the hopper, the vertically-adjustable furrow-opener having a shank, 28, extending up through the said bracket, the rear bracket, 22, the horizontal independent furrow-closers 25, converging toward their rear ends, and having separate shanks 24, extending up through said rear bracket and held by a single set-screw, 23, and the roller 35, all constructed and combined substantially as set forth.

WILLIAM HENRY HOLCOMB.

Witnesses:
 ISAAC MORRIS,
 N. A. PORTER.